(12) United States Patent
Liu et al.

(10) Patent No.: US 12,335,672 B2
(45) Date of Patent: Jun. 17, 2025

(54) ELECTRONIC DEVICE

(71) Applicant: GOERTEK INC., Shandong (CN)

(72) Inventors: Chao Liu, Shandong (CN); Yi Zhang, Shandong (CN)

(73) Assignee: GOERTEK INC., Shandong (CN)

( * ) Notice: Subject to any disclaimer, the term of this patent is extended or adjusted under 35 U.S.C. 154(b) by 228 days.

(21) Appl. No.: 18/006,511

(22) PCT Filed: Nov. 7, 2020

(86) PCT No.: PCT/CN2020/127342
§ 371 (c)(1),
(2) Date: Jan. 23, 2023

(87) PCT Pub. No.: WO2022/041483
PCT Pub. Date: Mar. 3, 2022

(65) Prior Publication Data
US 2023/0283936 A1    Sep. 7, 2023

(30) Foreign Application Priority Data

Aug. 24, 2020    (CN) .......................... 202010857661.1

(51) Int. Cl.
*H04R 1/02* (2006.01)
*G06F 1/16* (2006.01)

(52) U.S. Cl.
CPC ........... *H04R 1/023* (2013.01); *G06F 1/1641* (2013.01); *G06F 1/1688* (2013.01); *H04R 1/028* (2013.01); *H04R 2499/15* (2013.01)

(58) Field of Classification Search
CPC .... H04R 1/023; H04R 1/028; H04R 2499/15; H04R 1/20; H04M 1/0214; H04M 1/03; G06F 1/1641; G06F 1/1688; G06F 1/1616; G06F 1/1624; G06F 1/1637; G06F 1/1647; G06F 1/1652; G06F 1/1626

See application file for complete search history.

(56) References Cited

FOREIGN PATENT DOCUMENTS

| CN | 2296037 Y | 10/1998 |
|----|-----------|---------|
| CN | 102368165 A | 3/2012 |
| CN | 103677139 A | 3/2014 |
| CN | 205017545 U | 2/2016 |
| CN | 207588939 U | 7/2018 |
| CN | 207589073 U | 7/2018 |
| CN | 207926666 U | 9/2018 |
| CN | 208956111 U | 6/2019 |
| CN | 208986973 U | 6/2019 |
| CN | 111350923 A | 6/2020 |
| JP | 2007184966 A | 7/2007 |
| WO | 2019000739 A1 | 1/2019 |

*Primary Examiner* — Tuan D Nguyen
(74) *Attorney, Agent, or Firm* — LKGlobal | Lorenz & Kopf, LLP

(57) ABSTRACT

An electronic device includes, but is not limited to a device body (1), a display screen (2, 2', 2") position-adjustably disposed on the device body (1), and a speaker disposed in the device body (1). The device body (1) is provided with sound holes (3) for sound to pass through at least on a display screen mounting surface. The display screen (2, 2', 2") is movable between a shielding position at which all the sound holes on the display screen mounting surface are shielded and a non-shielding position at which part or all of the sound holes (3) on the display screen mounting surface are exposed outside.

16 Claims, 3 Drawing Sheets

ELECTRONIC DEVICE

CROSS-REFERENCE TO RELATED APPLICATIONS

This application is a U.S. National-Stage entry under 35 U.S.C. § 371 based on International Application No. PCT/CN2020/127342, filed Nov. 7, 2020 which was published under PCT Article 21(2) and which claims priority to Chinese Application No. 202010857661.1, filed Aug. 24, 2020, which are all hereby incorporated herein in their entirety by reference.

TECHNICAL FIELD

This application pertains to an electronic device.

BACKGROUND

With the development of artificial intelligence technology and the popularization of intelligent hardware, the screen function of intelligent speakers with screen not only bring more visual and touch experiences to consumers, but also enable users to experience multi-mode interactive experiences. At the same time, as a carrier of display, the screen also makes the smart home more visual, thereby allowing users to more intuitively see the status of smart devices at home, such as to perform camera monitoring, security linkage with smart doorbells, streaming media video resource playing, etc.

With the popularity of full screen, speakers with screen also begin to adopt a full screen design, and thus sound holes of the speakers can only be designed on the side, back or bottom surface of the speakers. This design can meet the requirements when used in some scenarios with low requirements for sound quality, such as daily dialogues, consulting, inquiries, etc., but when used in some scenarios with high requirements for sound quality, such as listening to music, browsing streaming media resources, etc., this design will have a great negative impact on the sound quality since sound cannot play out from the front surface. In addition, other objects, desirable features and characteristics will become apparent from the subsequent summary and detailed description, and the appended claims, taken in conjunction with the accompanying drawings and this background.

SUMMARY

An object of the present disclosure is to provide an electronic device, which can realize the full screen design and can play sound from the front surface when required.

To achieve the object, the present disclosure provides the following technical solutions:

An electronic device, comprising: a device body, a display screen position-adjustably disposed on the device body, and a speaker disposed in the device body, wherein the device body is provided with sound holes for sound to pass through at least on a display screen mounting surface for mounting the display screen, and the display screen is movable between a shielding position at which all the sound holes on the display screen mounting surface are shielded and a non-shielding position at which part or all of the sound holes on the display screen mounting surface are exposed outside.

Preferably, the display screen comprises a first folding screen and a second folding screen that are bendably connected by a folding part; at the shielding position, the display screen is in an expanded state that the first folding screen and the second folding screen are in a same plane; and at the non-shielding position, the display screen is in the expanded state that the first folding screen and the second folding screen are in a same plane, or the display screen is in a folded state that the first folding screen and the second folding screen form an included angle therebetween and are not in a same plane.

Preferably, the display screen comprises multiple subscreens, and at least one of the subscreens is position-adjustably disposed on the device body.

Preferably, the subscreens are all position-adjustably disposed on the device body through a position adjustment mechanism, and the position adjustment mechanism is configured to simultaneously or independently adjust positions of the subscreens.

Preferably, the display screen is rotatably and/or slidably disposed on the device body.

Preferably, the electronic device further comprises: a control means and a drive means, the drive means for driving the display screen to move between the shielding position and the non-shielding position, and the control means for receiving a user command to control actions of the drive means.

Preferably, the user command comprises at least one type of the following commands: key command, voice command, infrared remote control command and touch command.

An electronic device, comprising: a device body, a display screen position-adjustably disposed on the device body, and a speaker disposed in the display screen, wherein at least one surface of the display screen is provided thereon with sound holes for sound to pass through, and the sound holes on at least one surface of the display screen can face toward a front surface of the device body by adjusting a position of the display screen.

Preferably, the display screen comprises multiple subscreens, at least one of the subscreens is position-adjustably disposed on the device body, the at least one position-adjustable subscreen is provided thereon with the sound holes, and the sound holes can face toward the front surface of the device body by adjusting a position of the subscreen.

Preferably, the display screen comprises a first folding screen and a second folding screen that are bendably connected by a folding part, at least one of the first folding screen and the second folding screen is provided with the sound holes, and the first folding screen and the second folding screen can be folded to a preset angle relative to each other to make the sound holes face toward the front surface of the device body.

Preferably, the display screen is rotatably and/or slidably disposed on the device body.

An electronic device, comprising: a device body, a display screen position-adjustably disposed on the device body, and a speaker position-adjustably disposed on the device body or the display screen, wherein the device body and/or the display screen are provided thereon with an accommodating chamber in which the speaker can be fully accommodated, a casing of the speaker is provided thereon with sound holes for sound to pass through, and when and only when the display screen is at non-shielding position relative to the device body, the speaker can be expanded relative to the display screen or the device body so that all or part of the sound holes on the speaker face toward a front surface of the device body.

Preferably, when the display screen moves from a shielding position to a non-shielding position relative to the device body, the speaker is gradually expanded relative to the display screen or the device body so that all or part of the sound holes face toward the front surface of the device body.

Preferably, the display screen is slidably and/or rotatably disposed on the device body, and the speaker is slidably or rotatably disposed on the device body or the display screen.

It can be seen from the above technical solutions that, the present disclosure discloses an electronic device, which comprises a device body, a display screen position-adjustably disposed on the device body, and a speaker disposed in the device body, wherein the device body is provided with sound holes for sound to pass through at least on a display screen mounting surface for mounting the display screen, and the display screen is movable between a shielding position at which all the sound holes on the display screen mounting surface are shielded and a non-shielding position at which part or all of the sound holes on the display screen mounting surface are exposed outside. By using a position-adjustable display screen, the electronic device can adopt a full screen design on the front surface. In a scenario with low requirements for sound quality, the display screen may be placed at a shielding position, and completely shield the sound holes provided on the front surface of the device body, i.e., provided on the display screen mounting surface, so that there is only the full screen on the front surface of the device body. On the other hand, in a scenario with high requirements for sound quality, the display screen may be moved to expose part or all of the sound holes on the display screen mounting surface, so as to play sound from the front surface of the electronic device and improve the sound quality of the electronic device. It should be noted that the electronic device includes but is not limited to an acoustic enclosure, a mobile phone and a tablet computer.

BRIEF DESCRIPTION OF DRAWINGS

The present invention will hereinafter be described in conjunction with the following drawing figures, wherein like numerals denote like elements, and.

Figure 1:
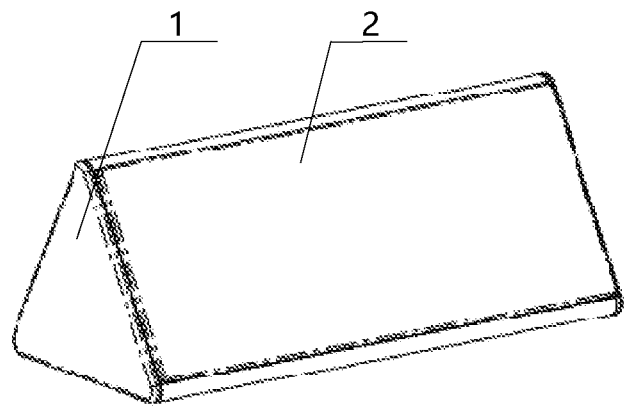
FIG. 1 is a schematic diagram of the structure of an electronic device according to an embodiment of the present disclosure.

In the drawings: 1, device body; 2, 2', 2", display screen; 3, sound hole.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The core of the present disclosure is to provide an electronic device, which can realize the full screen design and can play sound from the front surface when required.

The technical solutions in embodiments of the present disclosure will be described clearly and completely below with reference to the drawings in the embodiments of the present disclosure. Obviously, the embodiments as described below are merely part of, rather than all, embodiments of the present disclosure. Based on the embodiments of the present disclosure, any other embodiment obtained by a person of ordinary skill in the art without paying any creative effort shall fall within the protection scope of the present disclosure.

An embodiment of the present disclosure discloses an electronic device, which includes but is not limited to an acoustic enclosure, a mobile phone, and a tablet computer. The electronic device comprises a device body 1, a display screen position-adjustably disposed on the device body 1, and a speaker disposed in the device body 1.

The device body 1 may be of a variety of shapes, and its cross section includes but is not limited to triangle, rectangle, circle, and ellipse. The device body 1 is provided with sound holes for sound to pass through at least on a display screen mounting surface for mounting the display screen. Multiple sound holes are provided, and may be distributed on the entire display screen mounting surface, or are provided only locally on the display screen mounting surface. The display screen is movable between a shielding position at which all the sound holes on the display screen mounting surface are shielded and a non-shielding position at which part or all of the sound holes on the display screen mounting surface are exposed outside.

It can be seen that, compared with the prior art, by using a position-adjustable display screen, the electronic device according to the embodiment of the present disclosure can adopt a full screen design on the front surface. In a scenario with low requirements for sound quality, the display screen may be placed at the shielding position, and completely shield the sound holes provided on the device body 1 and facing the front surface, i.e., provided on the display screen mounting surface, so that there is only the full screen on the front surface of the device body 1. On the other hand, in a scenario with high requirements for sound quality, the display screen may be moved to expose part or all of the sound holes on the display screen mounting surface, so as to play sound from the front surface of the electronic device and improve the sound quality of the electronic device.

Figure 2:
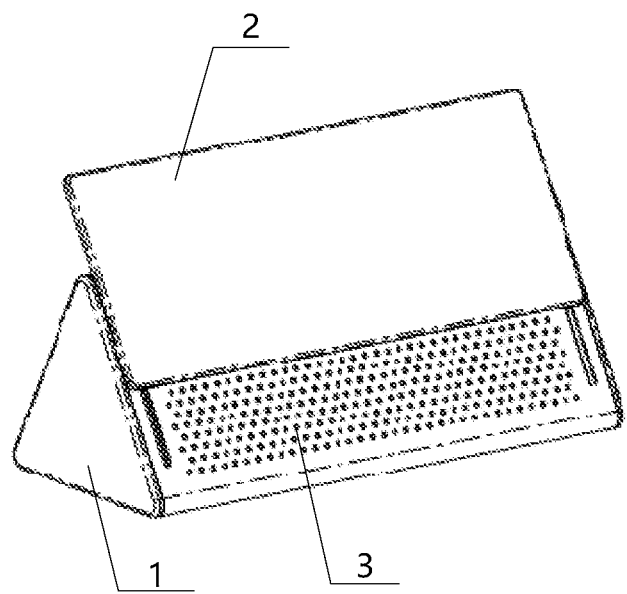
FIG. 2 is a schematic diagram of an adjustment structure when a display screen of the electronic device in the embodiment shown in FIG. 1 is in a non-folded state.

The display screen may be a whole screen, or a folding screen, or a splicing screen of multiple screens. Specifically, as shown in FIG. 1 and FIG. 2, in an embodiment of the present disclosure, the display screen 2 is a whole screen. In a scenario with low requirements for sound quality, such as daily dialogues, consulting, inquiries, etc., the display screen 2 may be kept in the state of FIG. 1. In a scenario with high requirements for sound quality, such as listening to music, the display screen 2 may be controlled to slide upward to expose the sound holes on the display screen mounting surface of the device body 1 to improve the sound quality. The movement of the display screen 2 may be completed manually by the user, or may be completed automatically by a driving means according to the user's command.

Further, the display screen 2 can realize position adjustment in a variety of ways, such as sliding. Its sliding direction may be up-down sliding, or inclined up-down sliding, or left-right sliding. It may also be flipping. The flipping may be flipping with any edge of the display screen 2 as the axis, or universal rotation with a vertex of the display screen 2 as the axis. Alternatively, the combination of flipping and sliding may be used. For example, the display screen 2 slides to a preset position and then flips. Alternatively, the display screen 2 may be provided on the device body 1 through an expansion bracket. First, the display screen 2 goes far away from the device body 1 through the expansion bracket, and then it rotates relative to the expansion bracket to expose the sound holes on the display screen mounting surface.

Figure 3:
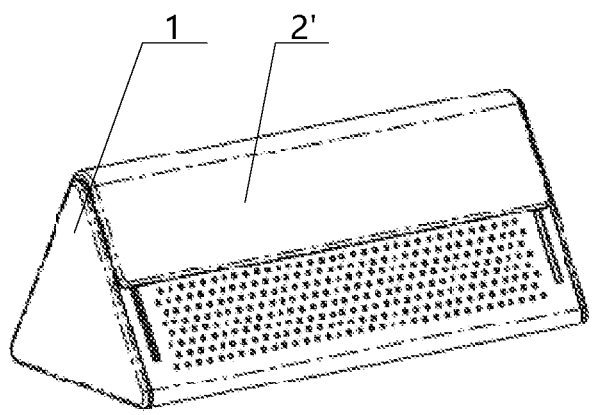
FIG. 3 is a schematic diagram of an adjustment structure when the display screen of the electronic device in the embodiment shown in FIG. 1 is in a folded state.
Figure 4:
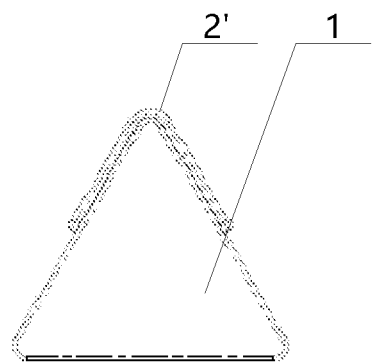
FIG. 4 is a side view of FIG. 3.

Preferably, as shown in FIGS. 3 and 4, the display screen 2' comprises a first folding screen and a second folding screen that are bendably connected by a folding part. At the shielding position, the display screen 2' is in an expanded state that the first folding screen and the second folding screen are in the same plane, that is, the state shown in FIG. 1. At the non-shielding position, the display screen 2' may be in the expanded state that the first folding screen and the second folding screen are in the same plane. At this point, the display screen 2' as a whole slides relative to the device body 1 to expose part or all of the sound holes. Alternatively, at the non-shielding position, the display screen 2' may be in a folded state that the first folding screen and the second folding screen form an included angle therebetween and are not in the same plane. The included angle between the first folding screen and the second folding screen may be set according to the user's needs. Specifically, in this embodiment, the first folding screen and the second folding screen may be set to a folding state in which they fit with two adjacent surfaces on the device body 1, respectively. At least one of the two adjacent surfaces is a surface on the device body 1 other than the display screen mounting surface. When moving from the shielding state to the non-shielding state, the display screen 2' can first slide upward from the state shown in FIG. 1 along the display screen mounting surface to enter the state shown in FIG. 2, and then the two folding screens rotate relative to each other so that one of them fits with the display screen mounting surface, and the other fits with the surface of the device body 1 adjacent to the display screen mounting surface.

Of course, when the display screen 2' is a folding screen, it may be that only one of the first folding screen and the second folding screen is rotated and the other remains still. Alternatively, the combination of flipping and sliding may be used, so that the display screen as a whole is directly rotated to go away from the display screen mounting surface.

Preferably, in another embodiment, the display screen 2" comprises multiple subscreens, and at least one of the subscreens is position-adjustably disposed on the device body 1.

More preferably, each subscreen of the display screen 2" is position-adjustably disposed on the device body 1 through a position adjustment mechanism. The position adjustment mechanism is configured to simultaneously or independently adjust positions of the subscreens. The position adjustment mechanism may comprise a slide rail or comprise a rotary shaft disposed between an edge of the device body 1 and the subscreens. On this basis, it may further comprise a linkage means provided between two subscreens. The linkage means is used to make two subscreens move synchronously and reversely.

Figure 5:
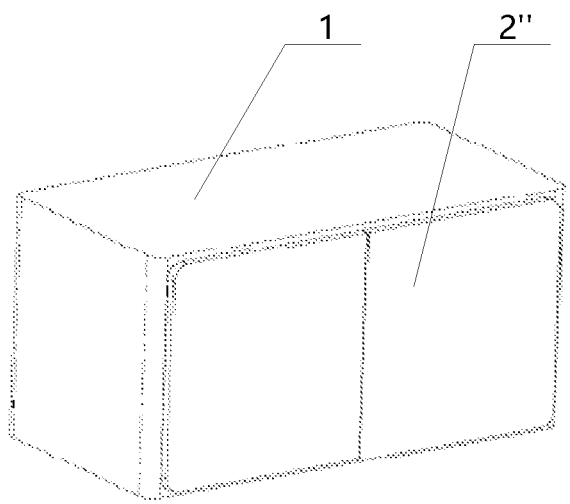
FIG. 5 is a schematic diagram of the structure of an electronic device according to another embodiment of the present disclosure.

As shown in FIG. 5, the display screen 2" comprises two subscreens. The two subscreens may be moved simultaneously, or only one of them may be moved.

Figure 6:
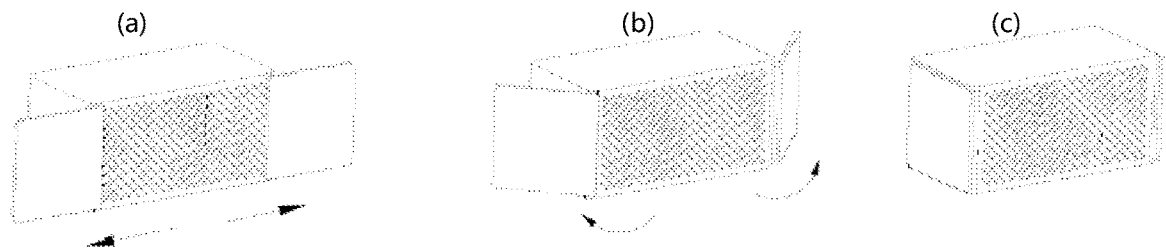
FIG. 6 is a diagram of a screen adjusting process of the electronic device according to another embodiment of the present disclosure.

Specifically, as shown in FIG. 6 which shows an expansion mode of the display screen 2" of the electronic device shown in FIG. 5. In FIG. 6a, first, the two subscreens slide to the left and right sides respectively to the edge positions of the device body 1. Of course, at these positions, the sound holes on the display screen mounting surface of the device body 1 have been exposed, and these positions may be used as the non-shielding position of the display screen 2".

Further, on the basis of FIG. 6a, a rotary shaft may be provided between an edge of the subscreen and an edge of the device body 1 for the rotation of the subscreen. When the subscreens slide to the left and right to the position shown in FIG. 6a, the two subscreens may be rotated backward to make the subscreens and the side surfaces of the device body form a certain angle. The specific angle may be set according to the user's needs. When the user is at different positions, the user may set different angles. Specifically, in this embodiment, the subscreens may be set to fit with two side surfaces of the device body 1, as shown in FIG. 6b and FIG. 6c.

Figure 7:
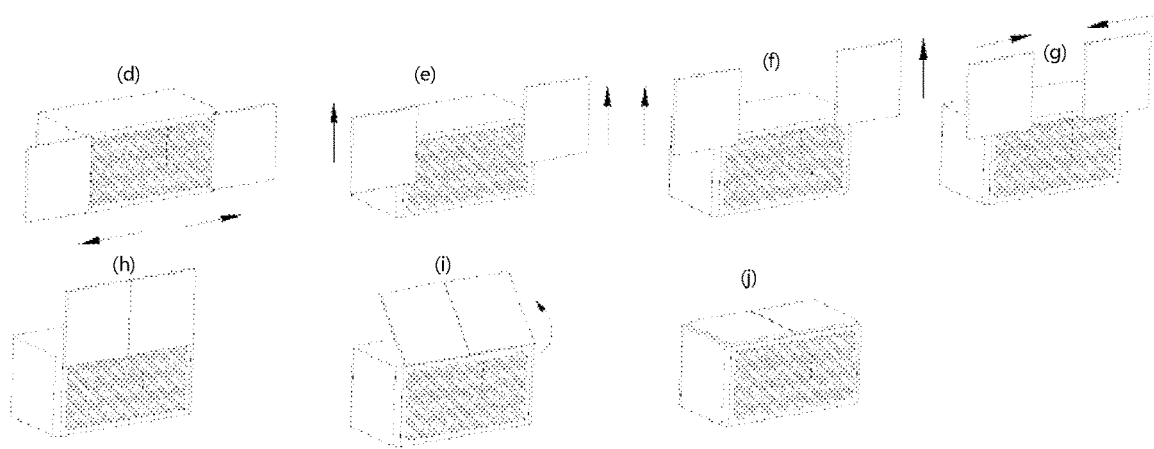
FIG. 7 is a diagram of another screen adjusting process of the electronic device according to another embodiment of the present disclosure.

Preferably, as shown in FIG. 7d to FIG. 7j which show another moving mode of the position of the display screen, the two subscreens may slide from the shielding position to the left and right sides respectively to the left and right edge positions of the device body 1, as shown in FIG. 7d; the two subscreens may further slide upward from the position shown in FIG. 7d to the upper edge position of the device body 1, as shown in FIG. 7e; the two subscreens may further slide towards the middle, as shown in FIG. 7f-FIG. 7h; the two subscreens may further be rotated backward from the position shown in FIG. 7h to a certain angle. In an embodiment, the two subscreens may be rotated backward to fit with the top surface of the device body 1, as shown in FIG. 1 and FIG. j. In practical applications, the position of each subscreen may be set according to the actual needs. The subscreens may be moved simultaneously; alternatively, one or more subscreens may be moved separately.

Figure 8:
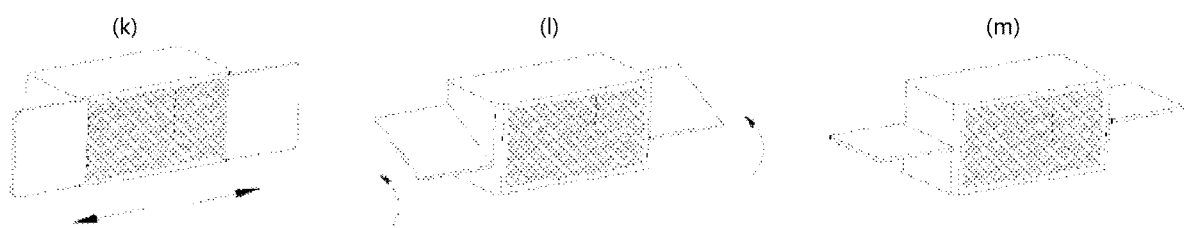
FIG. 8 is a diagram of yet another screen adjusting process of the electronic device according to another embodiment of the present disclosure.

As shown in FIG. 8 which shows another expansion mode when the display screen 2" is multiple subscreens. The two subscreens can slide to the left and right sides respectively to the edge positions of the device body 1, as shown in FIG. 8k. The two subscreens may also be rotated from the position shown in FIG. 8k to a certain angle with a vertex of the sub screen as the axis. FIG. 8m shows that the two subscreens are rotated to a horizontal position. In FIG. 8k, the subscreen is rotated with a vertex of the subscreen as the axis. The position of the axis may be set at any position on an edge of the device body 1. It may be the middle position of an edge of the device body 1, or a vertex position of an edge of the device body 1. In addition, the subscreen may be rotated in a certain plane, or rotated in a universal way around a certain axis, which may be specifically set according to the actual needs.

More preferably, the electronic device further comprises a control means and a drive means, the drive means is used to drive the display screen to move between the shielding position and the non-shielding position and the control means is used to receive a user command to control actions of the drive means.

Preferably, the user command comprises at least one type of the following commands: key command, voice command, infrared remote control command and touch command.

Further, an embodiment of the present disclosure also provides an electronic device, which includes but is not limited to an acoustic enclosure, a mobile phone, and a tablet computer. The electronic device comprises a device body 1, a display screen position-adjustably disposed on the device body 1, and a speaker disposed in the display screen.

The device body 1 may be of a variety of shapes, and its cross section includes but is not limited to triangle, rectangle, circle and ellipse. At least one non-display surface of the display screen is provided thereon with sound holes for sound to pass through. The sound holes on the at least one surface of the display screen can face toward the front surface of the device body 1 by adjusting the position of the display screen. The position adjustment here refers to sliding and/or rotating. Thus, the electronic device in this embodiment differs from the electronic device in the previous embodiment in that, the speaker is disposed in the display screen, the sound holes are provided on the casing of the display screen, and the sound holes can face toward the front surface of the device body 1 by adjusting the position of the display screen.

Specifically, if the display screen comprises multiple subscreens, at least one of the subscreens is position-adjustably disposed on the device body 1, the at least one position-adjustable subscreen is provided thereon with the sound holes, and the sound holes can face toward the front surface of the device body 1 by adjusting the position of the subscreen.

If the display screen comprises a first folding screen and a second folding screen that are bendably connected by a folding part, at least one surface other than the display surface of at least one of the first folding screen and the second folding screen is provided thereon with the sound holes, and the first folding screen and the second folding screen can be folded to a preset angle relative to each other to make the sound holes face toward the front surface of the device body 1.

Of course, the change of orientation of sound holes may also be achieved by sliding and rotating the folding screens.

Further, besides the two embodiments that the speaker is disposed in the device body 1 or in the display screen, an embodiment of the present disclosure also provides an electronic device, which comprises a device body 1, a display screen position-adjustably disposed on the device body 1, and a speaker position-adjustably disposed on the device body 1 or the display screen. The device body 1 and/or the display screen are provided thereon with an accommodating chamber in which the speaker can be fully accommodated, a casing of the speaker is provided thereon with sound holes for sound to pass through, and when and only when the display screen is at a non-shielding position relative to the device body 1, the speaker can be expanded relative to the display screen or the device body 1 so that all or part of the sound holes on the speaker face toward the front surface of the device body 1. In this embodiment, the speaker is provided externally as a separate component, and only when the display screen is in the non-shielding state the speaker can be expanded or retracted, and if the display screen is in the shielding state, the speaker cannot be expanded or retracted.

The position adjustment of the display screen includes sliding and/or rotation, and the position adjustment of the speaker includes sliding and/or rotation.

Preferably, in a specific embodiment of the present disclosure, the position adjustment of the display screen is linked with the position adjustment of the speaker, that is, when the display screen moves from a shielding position to a non-shielding position relative to the device body 1, the speaker is gradually expanded relative to the display screen or the device body so that all or part of the sound holes face toward the front surface of the device body 1.

Alternatively, when the display screen reaches a non-shielding position, the position of the speaker is not limited and it expands under the action of a driving means. The driving means may be a motor and a transmission mechanism, or may be a spring.

The embodiments in this specification are described in a progressive manner. Each embodiment focuses on the differences from other embodiments. The same or similar parts of the embodiments may be referred by each other.

The description of the embodiments disclosed herein enables those skilled in the art to implement or use the present disclosure. Various modifications to these embodiments will be apparent to those skilled in the art. The general principles defined herein may be implemented in other embodiments without departing from the spirit or scope of the present disclosure. Therefore, the present disclosure will not be limited to the embodiments shown herein, but will conform to the broadest scope consistent with the principles and novel features disclosed herein.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An electronic device, comprising: a device body, a display screen position-adjustably disposed on the device body, and a speaker disposed in the device body, wherein
   the device body is provided with sound holes for sound to pass through at least on a display screen mounting surface for mounting the display screen; and
   the display screen is movable between a shielding position at which all the sound holes on the display screen mounting surface are shielded and a non-shielding position at which part or all of the sound holes on the display screen mounting surface are exposed outside,
   wherein the display screen comprises a first folding screen and a second folding screen that are bendably connected by a folding part;
   at the shielding position, the display screen is in an expanded state that the first folding screen and the second folding screen are in a same plane; and
   at the non-shielding position, the display screen is in the expanded state that the first folding screen and the second folding screen are in a same plane, or the display screen is in a folded state that the first folding screen and the second folding screen form an included angle therebetween and are not in a same plane.

2. The electronic device according to claim 1, wherein the display screen comprises multiple subscreens, and at least one of the subscreens is position-adjustably disposed on the device body.

3. The electronic device according to claim 2, wherein the subscreens are all position-adjustably disposed on the device body through a position adjustment mechanism, and the position adjustment mechanism is configured to simultaneously or independently adjust positions of the subscreens.

4. The electronic device according to claim 2, wherein the display screen is rotatably and/or slidably disposed on the device body.

5. The electronic device according to claim 2, further comprising:
   a drive means for driving the display screen to move between the shielding position and the non-shielding position; and
   a control means for receiving a user command to control actions of the drive means.

6. The electronic device according to claim 1, wherein the display screen is rotatably and/or slidably disposed on the device body.

7. The electronic device according to claim 1, further comprising:
   a drive means for driving the display screen to move between the shielding position and the non-shielding position; and
   a control means for receiving a user command to control actions of the drive means.

8. The electronic device according to claim 7, wherein the user command comprises at least one type of the following commands: key command, voice command, infrared remote control command and touch command.

9. An electronic device, comprising: a device body, a display screen position-adjustably disposed on the device body, and a speaker disposed in the display screen, wherein
   at least one surface of the display screen is provided thereon with sound holes for sound to pass through, and the sound holes on the at least one surface of the display screen can face toward a front surface of the device body by adjusting a position of the display screen.

10. The electronic device according to claim 9, wherein the display screen comprises multiple subscreens, at least one of the subscreens is position-adjustably disposed on the device body, the at least one position-adjustable subscreen is provided thereon with the sound holes, and the sound holes can face toward the front surface of the device body by adjusting a position of the subscreen.

11. The electronic device according to claim 9, wherein the display screen comprises a first folding screen and a second folding screen that are bendably connected by a folding part, at least one of the first folding screen and the second folding screen is provided with the sound holes, and the first folding screen and the second folding screen can be folded to a preset angle relative to each other to make the sound holes face toward the front surface of the device body.

12. The electronic device according to claim 9, wherein the display screen is rotatably and/or slidably disposed on the device body.

13. An electronic device, comprising: a device body, a display screen position-adjustably disposed on the device body, and a speaker position-adjustably disposed on the device body or the display screen, wherein
   the device body and/or the display screen are provided thereon with an accommodating chamber in which the speaker can be fully accommodated;
   a casing of the speaker is provided thereon with sound holes for sound to pass through; and
   when and only when the display screen is at a non-shielding position relative to the device body, the speaker is expanded relative to the display screen or the device body so that all or part of the sound holes on the speaker face toward a front surface of the device body.

14. The electronic device according to claim 13, wherein when the display screen moves from a shielding position to the non-shielding position relative to the device body, the speaker is gradually expanded relative to the display screen or the device body so that all or part of the sound holes face toward the front surface of the device body.

15. The electronic device according to claim 14, wherein the display screen is slidably and/or rotatably disposed on the device body, and the speaker is slidably or rotatably disposed on the device body or the display screen.

16. The electronic device according to claim 13, wherein the display screen is slidably and/or rotatably disposed on the device body, and the speaker is slidably or rotatably disposed on the device body or the display screen.

* * * * *